Sept. 26, 1939.      B. ROBERTS      2,173,956
MOTOR POWERED BICYCLE
Filed Feb. 7, 1938      2 Sheets-Sheet 1
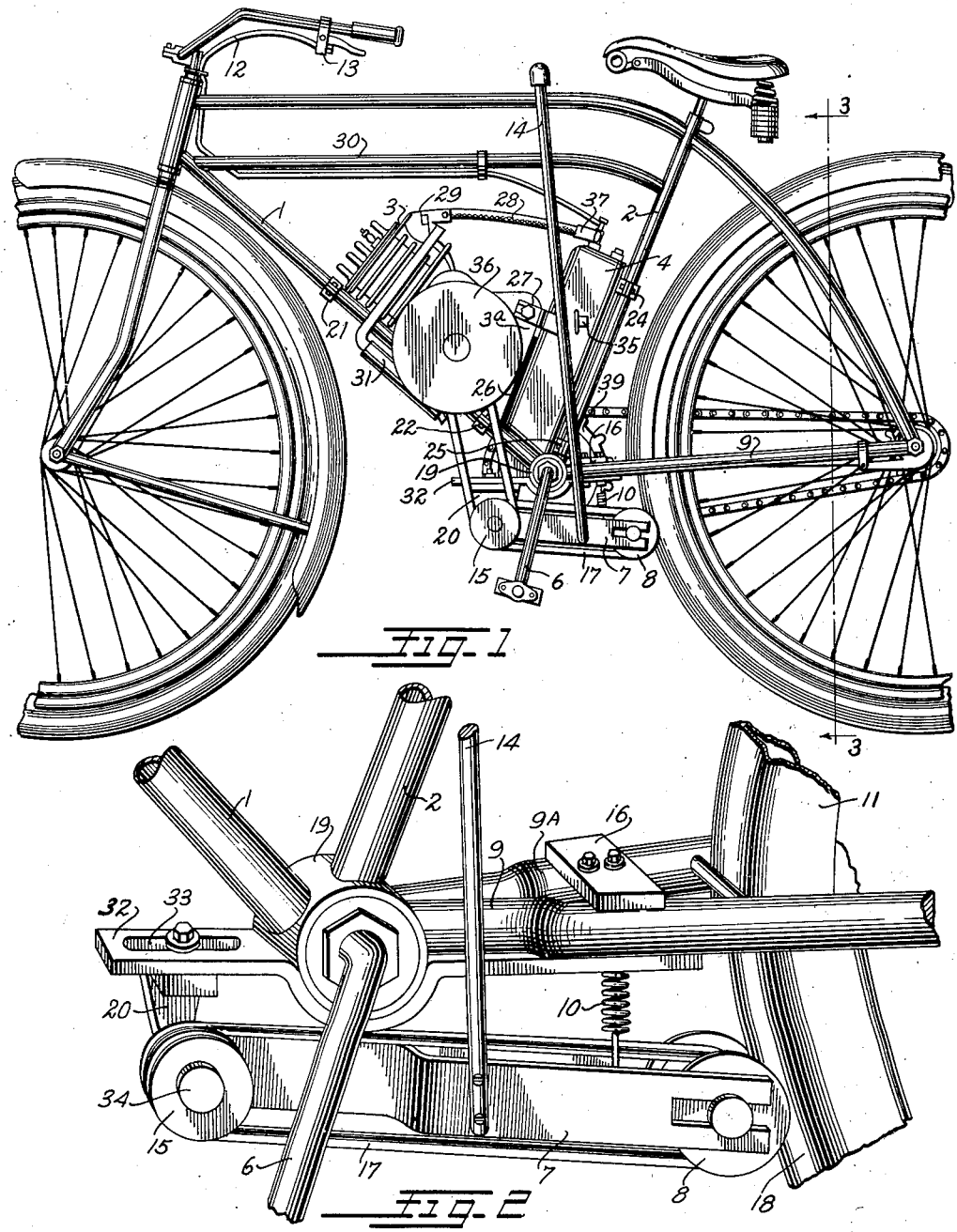
INVENTOR
Bruce Roberts
By Lyon & Lyon
Attorneys Sept. 26, 1939.  B. ROBERTS  2,173,956
MOTOR POWERED BICYCLE
Filed Feb. 7, 1938  2 Sheets-Sheet 2
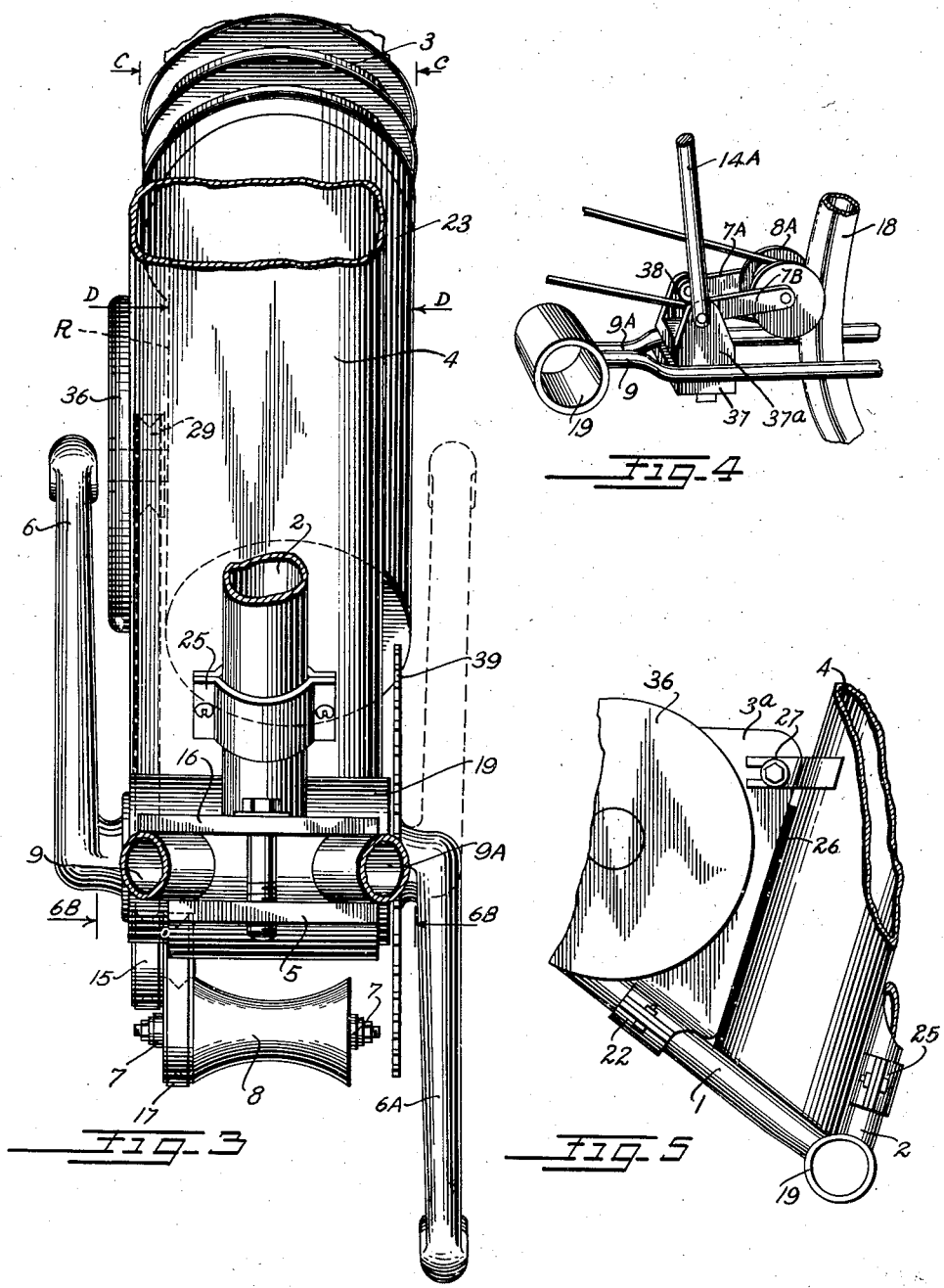
INVENTOR
Bruce Roberts
By Lyon & Lyon
Attorneys Patented Sept. 26, 1939

2,173,956

UNITED STATES PATENT OFFICE 2,173,956

MOTOR POWERED BICYCLE

Bruce Roberts, Hollywood, Calif., assignor to Breene-Taylor Engineering Corp., a corporation of California Application February 7, 1938, Serial No. 189,135

6 Claims. (Cl. 180—33)

This invention relates to improvements in motor powered bicycles and, more particularly, to motor power devices readily attachable to conventional bicycles.

Generally speaking, the object of this invention is to provide a motive power device for a conventional bicycle which may be readily and conveniently attached without changing any of the original structure or assembly of the bicycle and so that the resultant combination may have the general appearance and essential elements of a conventional motorcycle.

Heretofore, other power devices adaptable to bicycles have required for their attachment that some of the parts of the bicycle be removed or disassembled, and the motors therefore have been integral with the transmission means to propel the bicycle. It is accordingly an object of my invention to provide a readily attachable power transmission adaptor which may be coupled with any suitable motor to propel a conventional bicycle.

As other mechanisms heretofore offered have been devices of considerable weight and have been mounted either ahead, behind or above the central axial point of the bicycle resulting in inconvenient balancing by the rider, it is accordingly a further object of my invention to provide means for readily attaching a motor propelling device to a conventional bicycle without substantially changing the center of gravity of the assembled combination.

Another object of my invention is to provide a motor structure of sufficient power and efficiency yet sufficiently narrow and limited in size as to be attached to a conventional bicycle within the limits of the central frame structure of the bicycle and between the planes in which the pedal cranks revolve.

As there is some considerable differentiation in the angular relationship of the converging upright main frame section of conventional bicycles it is accordingly an object of my invention to provide an adjustably coupled means for mounting the motor and fuel tank to these frame sections to compensate for their angular differences and to further brace the motor and fuel tank.

Further objects of the invention will appear hereinafter.

My invention possesses other advantages, and has other objects which may be more readily apparent from a consideration of one of the embodiments of my invention. For this purpose I have shown a form in the drawings accompanying and forming part of the present specification. I shall proceed to describe this form in detail, which illustrates the general principles of my invention; but it is to be understood that this detailed description is not to be taken in a limited sense since the scope of my invention is best defined by the appended claims.

Referring to the drawings:

Figure 1 is a side view of a bicycle illustrating an embodiment of my invention.

Fig. 2 is a perspective view of some of the parts illustrated in Fig. 1 and illustrating the preferred embodiment of my power transmission adaptor.

Fig. 3 is a detail section about in the plane of the line 3—3 of Fig. 1, certain parts being broken away.

Fig. 4 is a fragmentary perspective illustrating another embodiment of the adapter constituting a part of my invention.

Fig. 5 is a detail section of Fig. 1 illustrating the adjustable coupling means of the fuel tank and the motor.

The apparatus is shown in its entirety in Fig. 1. A conventional bicycle with fenders is shown with its upright diagonal frame bar or forward strut 1 and upright bar or seat mast 2. Detachably mounted on the frame section 1 is a suitable motor 3 which will be described further on in more detail, and behind the motor is mounted a fuel tank 4 on the frame section 3. The motor 3 and the fuel tank 4 are constructed to fit into and fill the angle between the frame bars 1 and 2. For this purpose the fuel tank is formed so that its bottom and side section fit into the angular space formed by the frame sections 1 and 2; and the motor 3 has a projecting abutment 3a, the edge of which is inclined so as to fit up against the tank. Since it is of great advantage to maintain ease in installing the device engaging means between the motor and the tank are provided. In the present instance the motor is secured to the frame section 1 by the clamps 21 and 22 which are preferably lined with rubber to dampen the vibration of the motor. The fuel tank 4 may be fastened with simple split clamps 24 and 25 secured with bolts around the frame members 2.

Since it is necessary to more rigidly fasten the motor and the fuel tank so that they do not have a tendency to pivot about their respective supports, a substantial and adjustable bracket 27 is mounted on the fuel tank and connected to the motor which may be seen more clearly in Fig. 5. As there is some variation in the angle of the two upright diagonal frame members in bicycles offered commercially and whereas the fuel tank forms a partial support for the motor as it is downward from it, a flexible cushion such as a strip of rubber 26 is disposed between the motor and fuel tank as an angularly compensating support. This absorbs vibration from the engine. Rubber linings for the clamps as referred to herein, have a similar effect. The fuel intake pipe 28 is preferably a hose of flexible water tight material and is also adjustable in its housing 29 to compensate for angular adjustments between the motor and fuel tank.

One of the main features of the apparatus is a power transmission device 5 (Figs. 1, 2, 3). In applying my invention it is unnecessary to change the original assembly of the bicycle. As most conventional bicycles have fenders I have provided transmission means for driving the rear wheel 18, located at a point below its fender 11, and preferably supported on the rear forks 9 and 9A. In Fig. 1 this driving means is indicated as supported under the forks and adjacent the crank-shaft hanger 19.

In the particular form shown a bracket 32 is provided in the form of a clamp the lower part of which is made to conform to the shape of the pedal crank housing 19. This helps to keep it in position when bolted together with its associate clamp member 16 with bolts located between the forks 9 and 9A. The clamp 32 is made to project forward of the crank housing and adjustably attached to its lower side and projecting downward is a hanger bracket 20 with a spindle 34 rigidly fixed at right angles to its lower extremity. Pivotally mounted on the spindle 34 and extending backward is the arm 7 that carries the moving parts of the driving means. The arm 7 preferably has a recess on one side to allow for the journalling of means for driving a driving roller 8 that can engage the tire of the wheel as shown. In the present instance I have shown the double pulley 15 at the end of the spindle 34. The inside groove of the double pulley is spaced so as to be in line with a grooved section of the driver roller member 8 rotatably mounted on the arm 7. A V-belt 17 is connected to run in these two grooves and drive the roller 8. Means for pulling up the free end of the arm 7 is provided, preferably consisting of a sufficiently heavy spring 10 fastened at one end of the clamp section 16 and at its other end to the arm 7.

As there is some difference in the distances in conventional bicycles between the center of the crank housing and the front of the rear wheel it may be necessary to provide for adjusting the hanger arm 20 back or forth along the slot 33 in the bracket 32 to bring the roller member 8 into contact with the tire 18. This should be done in such a way that the rear end of the arm 7 inclines downward. Then the spring 10 will pull the arm 7 with its roller 8 into contact with the tire. As the roller 8 revolves in the direction indicated by an arrow on its side in Fig. 2 it will also be evident that the roller will have a better grip on the tire.

The lever 14 is fastened to the arm 7 and projects upward to a convenient place to be operated by the rider. When this lever is pulled backwards the arm 7 will swing about its supporting spindle 15 and the roller 8 will become disengaged from the tire 18. It may be seen that the action of this apparatus when coupled with any suitable motor will act as a transmission device with a "clutch" function to drive the bicycle.

In reference to the position of the parts it will be noted that the fabrication of the power transmission device and the fuel tank so as to be sufficiently narrow to be applied in their afore-mentioned positions and operate between the pedal cranks without interfering with their normal operation, is a simple matter. However, since no motors are available commercially which are sufficiently narrow to be applied to the frame of a bicycle in the position previously referred to and possessing sufficient power to drive a bicycle I shall describe herein a motor particularly suited to this purpose.

As four-cycle motors are readily operatable by persons of limited mechanical knowledge since they do not require a special mixture of gas and oil and carburete more easily, a conventional four-cycle engine has been selected. With the exception of the fly wheel and crank case which I will describe, the motor is of any conventional construction.

An air cooled motor of sufficient power is employed which has a cylinder with an outside diameter nearly as large as the space between the pedal cranks, and as a fly wheel 36 is needed to produce a smooth running motor it will be seen that the fly wheel must be narrow so as not to extend into the plane into which the pedal crank operates. The axis of the cylinder of the motor is preferably substantially parallel to the forward strut 1 of the bicycle frame. Referring more particularly to Fig. 3 it will be evident that as the fly wheel must be narrow in thickness its diameter must be increased to a point wherein its circumference is beyond the junction of the crank case and cylinder. Also, in the usual construction of crank cases for such motors the crank case is as wide or wider than the space between the planes of the side extremities of the cylinder block, as indicated by the line C—C' in Fig. 3. I propose to make the main bearings of ball bearing races which practice in light motors has proven satisfactory in recent years. Since ball bearing races are narrower than other types of bearings for the same load only small clearance is necessary, and this is provided by a recess in the crank case. In the drawing, the side D of the crank case 23 is recessed back as at R so that the motor parts lie within the planes of the sides of the cylinders, that is, in the space indicated by the line D—D in Fig. 3. In this recess is placed the power transmission means such as a pulley 29, or sprocket to transmit the power from the motor shaft to the power transmission device 5 heretofore described.

It may also be seen that as the fly wheel 36 is of disc form it presents a smooth exterior face and although revolving, does not present an element of danger; and that the mounting of the driving member 29 located back of the fly wheel, is placed in a guarded position, preventing objects from being caught therein.

As the space within which the motor and fuel tank are placed is quite limited, the side and base portions of the motor are constructed to angularly conform to the space limited by the two upright diagonal frame members of a conventional bicycle, seen in Fig. 5.

In other forms of conventional bicycles, without fenders, such as racing bicycles, the type of power transmission device such as shown in Fig. 4 would also be thoroughly practical and less expensive. A clamp comprising bracket members 37 and 37a carries a shaft 38 rigid with the arms 7A and 7B and the hand lever 14A. This clamp or bracket is also supported on the rear lower forks of the bicycle frame. At the extremities of the arms 7A and 7B is journalled a driving roller 8A similar to the one described in Fig. 2. It may be seen that a direct drive from the driving roller 8A to the motor pulley is possible since the position of the roller 8A is not in line with the crank housing of the bicycle, which to become operative would necessitate a second common pulley to avoid interference, as in the power transmission device previously referred to in Fig. 2. By slideably adjusting the clamp assembly 37a and 37 to the proper position on the forks 9 and 9A the driver roller 8A may be held in a suitable position to be brought into and out of engagement with the tire 18 by the manual operation of the lever 14A.

I shall set down a summary of the operation, and installing of my invention in applying it to a conventional bicycle. Referring again to Fig. 1, the clamp 27 between the motor and fuel tank should be loosely connected. After positioning the motor and fuel tank as close to their respective frame members as possible and to each other I secure the clamp members 21, 22, 24 and 25. The clamp member 27 is then tightened. In this way I secure the motor and fuel tank in place in the bicycle frame and fix them to each other.

It will be noted that in placing the fuel tank in the angle between the seat mast 2 and the forward strut 1, and seating the motor in the angle between the upper and forward face of the fuel tank, and the forward strut 1, the drive shaft of the engine is disposed somewhat forwardly of the crank hanger 19. This arrangement of the motor and fuel tank greatly facilitates the organizing of the parts that constitute the transmission mechanism from the motor shaft to the forward face of the rear wheel, because it enables me to provide the transmission means in the form of the belt 38 extending down from the motor shaft to a point below and forward of the crank hanger 19, and from this point it is quite feasible to use flexible driving means 17 extending back to the roller 8 that engages the tire of the rear wheel.

The power transmission device 5 previously described is then attached to the rear horizontal forks 9 and 9A by clamping together the members 16 and 32, taking care to adjust the bracket member 20 so as to bring the arm 7 in a downward slanting position and the driving roller 8 into frictional contact with the tire 18. The V-belt 38 is used to connect the motor and the power transmission device 5 at the outside groove of the pulley 15. This belt may be tightened if necessary by placing a suitable shim between the crank housing 19 and the clamp member 32.

To operate the device the lever 14 is pulled back and secured behind the catch 35 mounted on the side of the fuel tank 4. This temporarily disconnects the drive to the rear wheel. Then the bicycle may be operated in the same manner as if the apparatus had not been applied. The bicycle is then mounted and ridden in the conventional manner until some momentum has been gained. The lever 14 is then pushed forward, causing the roller driver 8 to come into engagement with the tire 18 which in turn cranks the motor by power transmitted by the belts 17 and 38. The motor will then start and drive the bicycle. The hold on the lever 14 may be released since it will be held in operating position by the spring 10. After the motor has started, the speed may be controlled by the lever 13 journalled to a clamp fastened to the handle bar. A Bowden wire 12 operates therewith and is connected to the carburetor 37. The lever 14 will act as a clutch lever enabling the driving roller to be held away from the tire face, so that the motor may be kept running if the bicycle has been stopped, greatly facilitating its operation; and the brake, originally a part of the bicycle may be used, when desired, since none of the parts of the bicycle previous to attaching my apparatus have been disturbed.

It will be evident that the center of gravity of the bicycle before assembling the apparatus is slightly above and forward of the pedal crank housing and within the plane of the main frame. It is further apparent that the center of gravity of the assembled bicycle and my device is substantially in the same place as the bicycle without the apparatus, which is apparent in Fig. 1 and 3. Since the center of gravity of the assembled combination has not been substantially changed and the apparatus is of comparatively light weight, the feel and balance of the bicycle, while riding, will not be changed. This is a distinct advantage over other motor powered bicycle units heretofore offered.

It is to be understood that the embodiment of the invention described herein is only one of the many embodiments my invention may take and I do not wish to be limited in the practise of the invention, nor in the claims to the particular embodiment set forth.

What I claim is:

1. A bicycle having a frame with a crankshaft housing, a rear wheel, and a lower rear fork extending rearwardly from the crankshaft housing adjacent the rear wheel, in combination with a motor supported on said frame, a transmission mechanism with means for driving the same from the motor, said transmission mechanism including an arm with means for pivotally supporting its forward end on the said frame adjacent the crankshaft housing and so that the transmission mechanism extends rearwardly from its pivotal support toward the said wheel, said transmission mechanism including means carried at the rear end of the said arm for engaging the tire of the rear wheel.

2. A bicycle having a frame with a crankshaft housing, a rear wheel with a tire and a rear fork extending rearwardly from the crankshaft housing toward the rear wheel, in combination with a transmission mechanism including an arm with means for pivotally supporting the same adjacent the crankshaft housing so that the arm extends rearwardly and has its free end located adjacent the tire of the rear wheel, a driving roller carried at the rear end of the arm for engaging the tire of the said rear wheel, means carried by the arm for driving the said roller, and means for driving the last-named means from the motor.

3. A bicycle having a frame with a crankshaft housing, a rear wheel with a tire, and a rear fork extending rearwardly from the crankshaft housing toward the rear wheel, in combination with a transmission mechanism including an arm with means for pivotally supporting the same adjacent the crankshaft housing so that the arm extends rearwardly and has its free end located adjacent the tire of the rear wheel, a driving roller carried at the rear end of the arm for engaging the tire of the said rear wheel, means carried by the arm for driving the said roller, means for driving the last-named means from the motor, and a spring connected with the arm and urging the arm in a direction to maintain the roller in contact with the said rear wheel.

4. A bicycle having a frame with a crankshaft housing, a saddle mast extending upwardly therefrom and a lower forward strut extending upwardly and forwardly from the crankshaft housing, and also having a lower rear fork extending rearwardly from the crankshaft housing, in combination with a fuel tank lying in, and extending down into, the angle between the saddle mast and the said forward strut, a motor having a power cylinder supported on the upper side of the said forward strut with the lower end of the motor substantially abutting against the said fuel tank, and transmission mechanism for transmitting power from the motor to the rear wheel of the bicycle, including driving means extending downwardly from the motor to a point forward and below the crank hanger, and including driving means extending rearwardly under the rear fork, said last-named means including a driven roller engaging the tire of the rear wheel of the bicycle below the rear fork.

5. A bicycle having a frame with a crankshaft housing and a lower rear fork extending rearwardly therefrom, in combination with a motor supported on the frame, and transmission mechanism for transmitting power from the motor to the rear wheel of the bicycle, including means extending downwardly from the motor to a point forward and below the crank hanger, and means forming an angle with the last-named means and extending rearwardly under the rear fork, said last-named means including a driven roller engaging the tire of the rear wheel of the bicycle below the rear fork.

6. A bicycle having a frame with a crankshaft housing, a saddle mast extending upwardly therefrom, and a lower forward strut extending upwardly and forwardly from the crankshaft housing, and also having a lower rear fork extending rearwardly from the crankshaft housing, in combination with a motor having a power cylinder with its axis extending substantially parallel with said strut, and lying above said strut with the shaft of the motor extending in a substantially transverse horizontal plane, flexible driving means driven by the shaft and extending downwardly past the said strut to a point below and forward of the crank hanger; and means driven by said flexible means extending rearwardly below the said rear fork, and including a roller engaging the tire of the rear wheel of the bicycle.

BRUCE ROBERTS.